United States Patent [19]
Manno

[11] 4,286,408
[45] Sep. 1, 1981

[54] SELF-WATERING SEED PLANTER

[76] Inventor: Joseph Manno, 2329 Rue de Anne, La Jolla, Calif. 92037

[21] Appl. No.: 59,226

[22] Filed: Jul. 20, 1979

[51] Int. Cl.³ ...................... A01G 27/00; A01G 13/04
[52] U.S. Cl. ............................................ 47/27; 47/9; 47/29; 47/69; 47/74; 47/56
[58] Field of Search .................. 47/56, 74, 69, 66, 26, 47/27, 28 R, 29, 9

[56] References Cited

U.S. PATENT DOCUMENTS

| | | | |
|---|---|---|---|
| 757,045 | 4/1904 | Lane | 47/27 X |
| 1,160,279 | 11/1915 | Gray et al. | 47/56 |
| 1,930,939 | 10/1933 | Horner | 47/29 X |
| 2,197,594 | 4/1940 | Rowell | 47/56 |
| 2,446,509 | 8/1948 | Fisher | 47/29 |
| 2,542,555 | 2/1951 | Moores | 47/9 X |
| 2,807,912 | 10/1957 | Bjorksten | 47/27 UX |
| 2,812,618 | 11/1957 | Weston | 47/56 |
| 3,362,106 | 1/1968 | Goldring | 47/56 |
| 3,611,633 | 10/1971 | Shackelford | 47/29 X |
| 4,118,890 | 10/1978 | Shore | 47/69 X |
| 4,125,963 | 11/1978 | Johnson | 47/27 |

FOREIGN PATENT DOCUMENTS

| | | | |
|---|---|---|---|
| 640756 | 1/1937 | Fed. Rep. of Germany | 47/26 |
| 2363981 | 5/1978 | France | 47/27 |
| 7711701 | 4/1979 | Netherlands | 47/69 |

*Primary Examiner*—Steven A. Bratlie
*Attorney, Agent, or Firm*—Knox & Knox

[57] ABSTRACT

A planter adapted for small as well as large scale seed planting since the principal parts may be extruded or otherwise formed in any appropriate lengths, the planter being characterized particularly by having means for condensation and direction of the condensed soil water onto a limited area where the seeds are planted in a fertilized mulch, the planter producing hothouse conditions therewithin, base portions of the planter being self-destructing by reason of solution by soil water to prevent interference with root growth, and weed control being provided for by chemical weed retardant originally contained in aprons on each side of the planter, the lower layers of these aprons being soluble in soil water to release the chemical weed retardant.

3 Claims, 3 Drawing Figures

SELF-WATERING SEED PLANTER

BACKGROUND OF THE INVENTION

Several devices for seed-containing plant protectors and packages have been developed and some have been patented, the most pertinent known being the Gray et al Patent numbered U.S. Pat. No. 1,160,279, a forerunner in this field but disclosing only the basic elongated seed package concept. The Horner U.S. Pat. No. 1,930,939 and the Goldring U.S. Pat. No. 3,362,106 disclose, respectively, an elongated or circular "soil covering of translucent material", and an elongated tubular package with holes in which plants may be inserted and which are connected to a source of water, floated on water or stacked. U.S. Pat. No. 757,045 shows a pyramidal plant protector with apertures between the sides and a cap and centrally of the cap to let water into the enclosure. The very interesting U.S. Pat. No. 2,807,912 to Bjorksten discloses a solar still, this device employing wicks which extend into salt water of the ocean to draw water by capillary action for vaporization and condensation within a floating chamber which is metallic and cooled by direct contact with the ocean. Various "caps" have been developed and commercialized, these devices being primarily merely protective of the plants.

SUMMARY OF THE INVENTION

As claimed, the instant device goes beyond this prior art and comprises a planter which is solar heated by reason of an imperforate translucent hood, illustrated as considerably elongated, to trap natural soil water and by means of a reentrant drip edge top portion to direct condensed moisture to a limited area within a seed pan where seeds are planted in a fertilized mulch at the base of the hood, which base is of a unique construction extending laterally as soluble layers of aprons having insoluble upper layers integral with the hood proper, and weed retardant material is compressed between the adjacent layers of each apron. The hood proper is imperforate but the soluble base of the seed bed may be apertured to admit moisture into the hood even before the same disintegrates due to soil moisture.

DETAILED DESCRIPTION OF A PREFERRED EMBODIMENT

Figure 1:
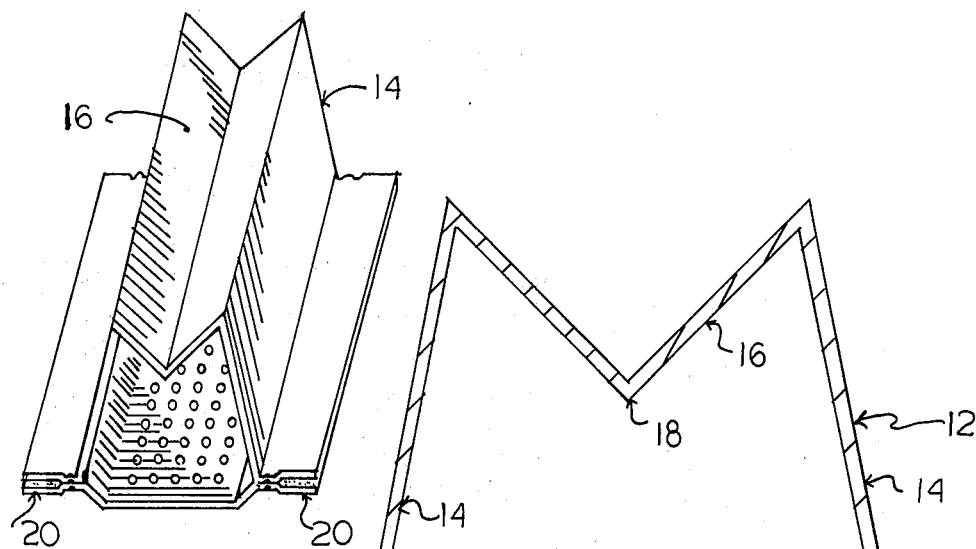
FIG. 1 is an isometric view of a short section of the planter without seeds or mulch and without end caps.
Figure 2:
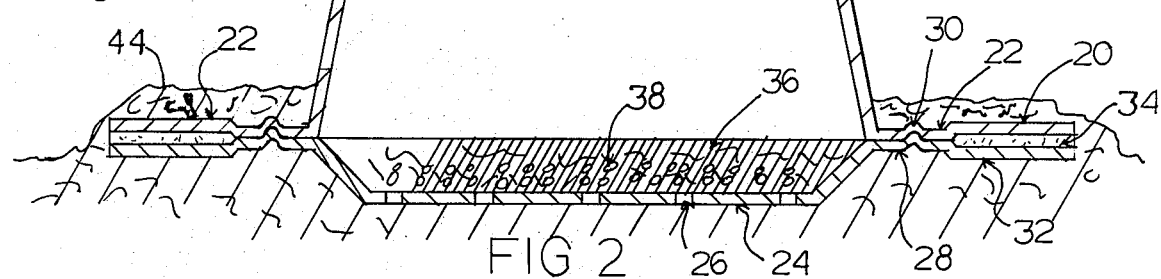
FIG. 2 is sectional view of the planter taken on a line 2—2 in FIG. 3, and showing soil mounded onto the lateral aprons to hold the planter in place, and indicating the fertilized mulch and planted seeds within the container.

Referring now to the drawing wherein like numerals refer to like or identical parts and portions throughout the several views, the hood generally indicated at 12 has horizontally elongated upstanding sides 14 and a top 16. The cross-sectional shape of this hood may vary somewhat, within the general concept of this invention, but as shown the sides converge upwardly and the top 16 is V-shaped and downwardly re-entrant between the sides so that a drip edge 18 is defined extending longitudinally of the hood, the foregoing directional terminology relating to the planter as disposed in use.

The hood 12 is imperforate and will ordinarily be constructed of an insoluble plastic which is translucent and reasonably form-retaining. Aprons 20 extend laterally outward from the hood at the base plane level thereof. The aprons 20 are each double layered, the upper layers 22 being formed unitary with the sides 14. A seed pan 24 extends the full length of the hood 12, underneath the same, and may be depressed slightly below the level of the aprons 20. The bottom at least of the seed pan 24 is apertured as at 26. The lower layers 28 of the aprons 20 may be formed unitary with the seed pan 24 and, like the seed pan, are water soluble. The two layers 22 and 28 of the aprons are crimped together as diagrammatically represented at 30, or otherwise connected, and the adjacent layers have major portions thereof separated to define pockets 32 for weed-retardant material 34. A fertilized mulch 36 is held in the seed pan and a complement of desired seeds 38 are located in this nutrient vertically beneath the drip edge 18.

Figure 3:
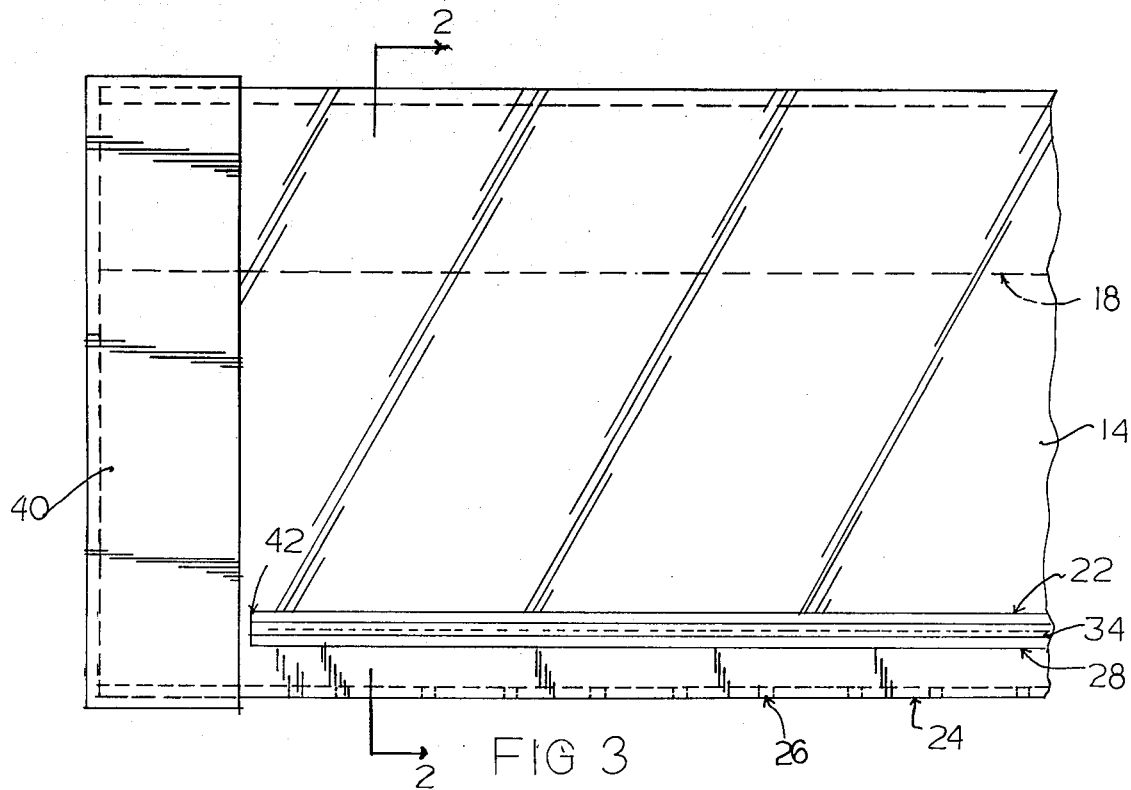
FIG. 3 is a side elevation view of one end of a planter showing an end cap and indicating how the lateral aprons may be terminally cut away so that a simple end cap construction may be used.

Finally, as to structure, the ends of the hood and seed pan are closed by end caps 40, one of which is shown in FIG. 3. In the interest of simplicity of design the end caps 40 may cover the ends of the hood and seed pan only, the ends of the aprons 20 being cut away as indicated at 42 in the same figure.

In using the planter, the same is placed with its complement of seeds, nutrient and weed-retardant on a suitably prepared ground surface in the garden or field. The seed pan 24 is preferably embedded and the planter is preferably anchored by mounding the soil, as indicated at 44, onto the tops of the aprons 20 to prevent dislodgement by the wind. Initial or periodic watering of the whole planting area may be desirable but the necessity of such watering is minimized or obviated since considerable soil moisture will be captured within the imperforate hood and solar heating combined with condensation of moisture on the inner surface of the hood, especially on the innersurface of the V-shaped top, will produce hothouse conditions within the hood, with condensed moisture dripping from the dripedge 18 onto the fertilized mulch 36 directly therebeneath to irrigate the seeds 38 at that location. The young plants are also protected from light frosts and from insects, it being desirable in some instances that the mulch 36 and/or the weed-retardant material 34 have insect repellants and soil pest repellants added thereto.

The aprons 20 as ground covers serve to blanket out weed growth and the solubility of the lower layers 28 of the aprons results in local dissemination of the weed-retardant material 34 bi-laterally of the planter. The seed pan 24 initially allows soil moisture to rise through the apertures 26 but, being water-soluble, quickly disintegrates and presents no barrier to the rise of soil moisture or to the developing root growth and, of course, permits eventual removal of the hood without damage to the plant roots.

What is claimed as new and desired to be secured by Letters Patent is:

1. A self-watering, weed retarding solar planter, comprising:
   (a) a self-supporting elongated hood having similar opposed upstanding sides with co-planar lower edges and a top joining said sides, said top having a re-entrant portion converging downwardly between the sides and defining a drip edge above the level of said co-planar lower edges;

(b) said sides and top including said drip edge being imperforate;

(c) said sides being translucent and having bilaterally outwardly extending horizontal aprons at said level, said aprons being functional as ground covers and as anchors for the planter when soil is mounded upon said aprons;

(d) an open topped seed pan secured to and between said co-planar lower edges and longitudinally coextensive with said hood, with a complement of seeds and mulch in said seed pan;

(e) said seed pan having a perforate bottom whereby, in use, soil moisture may initially enter the hood through said perforate bottom and with said translucent sides create miniature hothouse conditions within the hood and seed pan, while moisture condensing on said re-entrant portion is concentrated to fall onto a small area of the seed pan beneath said drip edge;

(f) said bottom of the seed pan being soluble so that the seed pan disintegrates allowing root growth and eventual removal of the hood without damage to the plant roots; and (g) said aprons each comprising an upper layer and a lower layer, said upper layer being unitary with said hood and said lower layer being unitary with the seed pan and likewise soluble, and said aprons having weed retardant material between said upper and lower layers.

2. A solar planter according to claim 1 wherein the planter has end caps closing the ends of the hood and seed pan only, said aprons being terminally cut away to permit the end caps to fit over the ends of the hood and seed pan.

3. A solar planter according to claim 1 wherein said seed pan is depressed slightly below the level of said coplanar lower edges, to be embedded in the soil.

* * * * *